US006819370B2

(12) United States Patent
Sah et al.

(10) Patent No.: US 6,819,370 B2
(45) Date of Patent: Nov. 16, 2004

(54) LIQUID CRYSTAL DISPLAY PANEL INCLUDING TWO PGB FOR OUTPUTTING SIGNALS TO THE SAME CONDUCTIVE WIRES AND A REPAIR LINE

(75) Inventors: Wen-Jyh Sah, Tainan Hsien (TW); Chin-Cheng Chien, Tainan Hsien (TW); Hsin-Hung Chen, Tainan Hsien (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 17 days.

(21) Appl. No.: 10/249,671

(22) Filed: Apr. 29, 2003

(65) Prior Publication Data

US 2004/0075800 A1 Apr. 22, 2004

(30) Foreign Application Priority Data

Oct. 17, 2002 (TW) ........................................ 91123990 A

(51) Int. Cl.⁷ ..................... G02F 1/1333; G02F 1/1345; G02F 1/13; G09G 3/36
(52) U.S. Cl. ........................... 349/54; 349/40; 349/149; 349/152; 349/192; 345/93
(58) Field of Search .................... 349/40, 54, 149–152, 349/192; 345/93

(56) References Cited

U.S. PATENT DOCUMENTS

| 5,805,246 A | * | 9/1998 | Lee et al. ...................... 349/40 |
| 6,023,310 A | * | 2/2000 | Kawamoto et al. ........... 349/54 |
| 6,111,558 A | * | 8/2000 | Jeung et al. .................. 345/93 |
| 6,111,621 A | * | 8/2000 | Kim et al. .................... 349/54 |
| 6,525,718 B1 | * | 2/2003 | Murakami et al. .......... 345/206 |
| 2002/0003590 A1 | * | 1/2002 | Ko et al. ....................... 349/54 |

FOREIGN PATENT DOCUMENTS

KR           2002061851        *   7/2002

* cited by examiner

Primary Examiner—Tarifur R. Chowdhury
(74) Attorney, Agent, or Firm—Winston Hsu

(57) ABSTRACT

A liquid crystal display panel includes a first substrate, at least two first printed circuit boards, and at least one repair line. Each of the first printed circuit boards is utilized to output signals to a plurality of first conducting wires in parallel arranged on the first substrate. Additionally, the repair line has a first part located on the first substrate, a second part located on each of the first printed circuit boards, and a third part located on a connecting region between the first printed circuit boards.

17 Claims, 9 Drawing Sheets

LIQUID CRYSTAL DISPLAY PANEL INCLUDING TWO PGB FOR OUTPUTTING SIGNALS TO THE SAME CONDUCTIVE WIRES AND A REPAIR LINE

BACKGROUND OF INVENTION

1. Field of the Invention

The invention relates to a liquid crystal display (LCD) panel, and more particularly, to an LCD panel that has a repair line structure with a lower RC delay.

2. Description of the Prior Art

In a thin film transistor (TFT) LCD panel, a plurality of thin film transistors, which are formed in a matrix, are in combination with appropriate electric components, such as capacitors and binding pads, to drive liquid crystal pixels to produce a beautiful image. Because TFT LCD panels are small, have a light weight, consume less power, and do not produce radiation, TFT LCD panels are widely used in many portable information products, such as notebooks and PDAs, and replace the traditional CRT monitors of personal computers.

An ordinary TFT LCD panels contains an upper substrate with a color filter, a lower substrate, and a liquid crystal material filled between the upper substrate and lower substrate. The lower substrate has a plurality of scan lines (also called gate lines) thereon and a plurality of data lines (also called signal lines) thereon perpendicular with the scan lines. At the intersection of each of the scan lines and data lines are set at least a thin film transistor for use as a switch device of a pixel. On the lower substrate are further formed a plurality of repair lines for serving as replacing wires to send a signal to every thin film transistor correctly when there is a disconnection on a data line.

Please refer to FIG. 1, which is a schematic structure of an LCD panel 10 according to prior art. As shown in FIG. 1, an LCD panel 10 contains a substrate 12, an X-axial printed circuit board (X-board) 14 and a Y-axial printed circuit board (Y-board) 16, and a flexible printed circuit board (FPC) 29 for electrically connecting the X-board 14 and the Y-board 16, wherein the X-board 14 and the Y-board 16 are used for transmitting signals to the substrate 12 to enable the LCD panel 10 to produce images. The LCD panel 10 further contains a plurality of tape carrier packages (TCPs) 18 for electrically connecting the X-board 14 and the substrate 12, and a plurality of TCPs 20 for electrically connecting the Y-board 16 and the substrate 12. Each TCP 18 or 20 contains an integrated circuit (IC) chip (not shown in FIG. 1).

The substrate 12 has a plurality of scan lines $S_1$-$S_m$ thereon and a plurality of data lines $D_1$-$D_n$ thereon perpendicular with the scan lines $S_1$-$S_m$. The scan lines $S_1$-$S_m$ and the data lines $D_1$-$D_n$ are used for defining a plurality of pixels (not shown in FIG. 1) formed in matrix in an active region 26 on the substrate. Each of the scan lines $S_1$-$S_m$ is electrically connected to its corresponding TCP 20 through a bonding pad 24, and similarly, each of the data lines $D_1$-$D_n$ is electrically connected to its corresponding TCP 18 through a bonding pad 22. The substrate 12 further contains at least a repair line 28. The repair line 28 is set on the X-board 14, Y-board 16, and the substrate 12 for repairing the data line $D_1$-$D_n$ on the substrate 12 when there is a disconnection on a data line $D_1$-$D_n$. The method of repairing a data line is described below.

Please refer to FIG. 2, which is a schematic diagram of a method using a repair line to repair an LCD panel 10 according to prior art. If a disconnection occurs at the point A of the data line $D_n$, the prior art method uses a laser welding to connect the terminals point B and C of the data line $D_n$ with the repair line 28. Therefore a signal will pass through the path 30 to every pixel when the X-board 14 outputs a signal to the data line $D_n$.

According to the prior art, the repair line 28 transversely crosses data line $D_1$-$D_n$, so it will cause an RC delay effect on the repair line. As a result, the effect of the RC delay will be greater when the size of the LCD panel 10 becomes larger and the RC delay will cause the distortion of the image signal on the panel finally. Therefore, how to distribute and set the repair line on the X-board, Y-board, or the substrate to reduce the RC delay becomes a main issue for improving the yield of manufacturing an LCD panel with a large size.

SUMMARY OF INVENTION

It is therefore a primary objective of the claimed invention to provide an LCD panel that has a repair line with a lower RC delay to solve the above-mentioned problem.

According to the claimed invention, the LCD panel contains a first substrate, at least two first printed circuit boards, and at least a repair line. The first substrate has a plurality of first conductive wires thereon, and the first conductive wires are arranged in parallel with each other along a first direction. Each of the first printed circuit boards is electrically connected to the first substrate respectively for outputting signals to the first conductive wires. In addition, the repair line contains a first portion positioned on the first substrate, a second portion positioned on each of the printed circuit boards, and a third portion positioned on a connective region located between each of the first printed circuit boards.

It is an advantage of the claimed invention that the LCD panel contains a connective region so that the repair line on each of the first printed circuit boards is capable of being connected in the connective region, wherein the connective region is set on the substrate, a flexible printed circuit (FPC), which electrically connects each of the first printed circuit boards, or a control board. If the connective region is set on the substrate of the LCD panel, the amount of the connectors for connecting two adjacent first printed circuit boards and the effect of the RC delay on the repair line will both be reduced. If the connective region is set on the FPC or a control board, the advantage is that the manufacturing process can be simplified.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
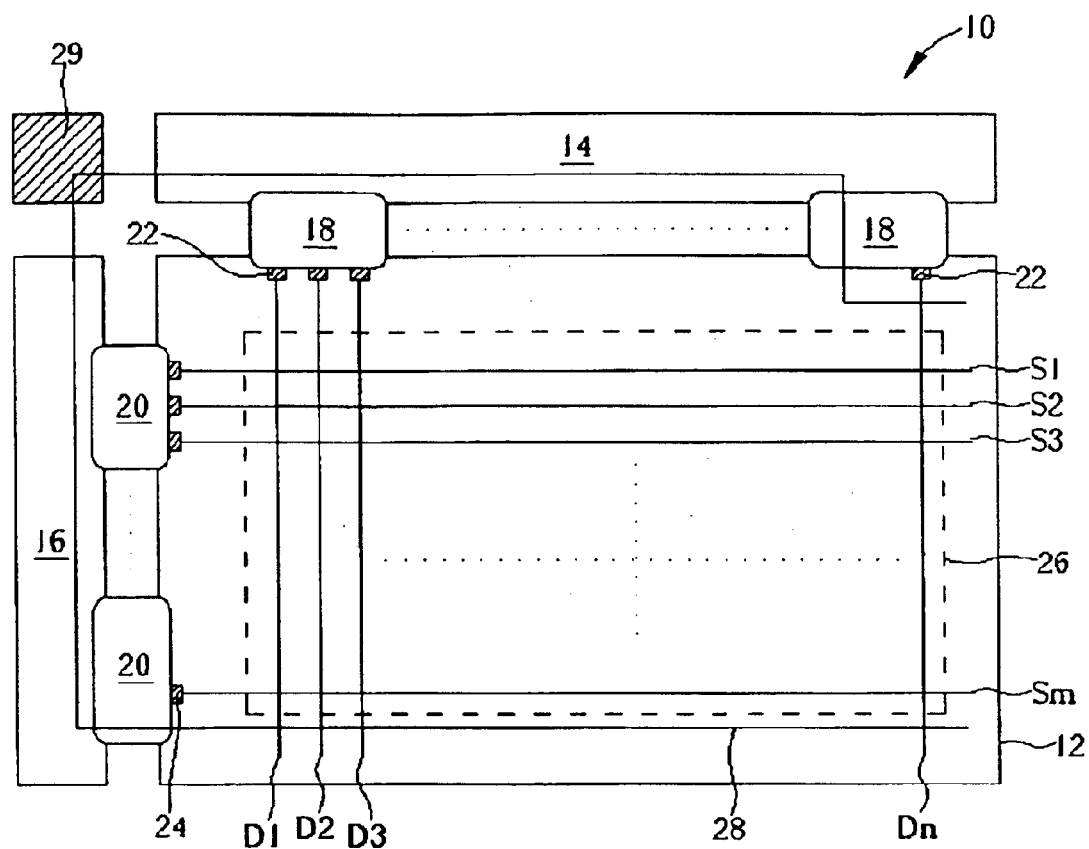
FIG. 1 is a schematic structure of an LCD panel according to prior art.
Figure 2:
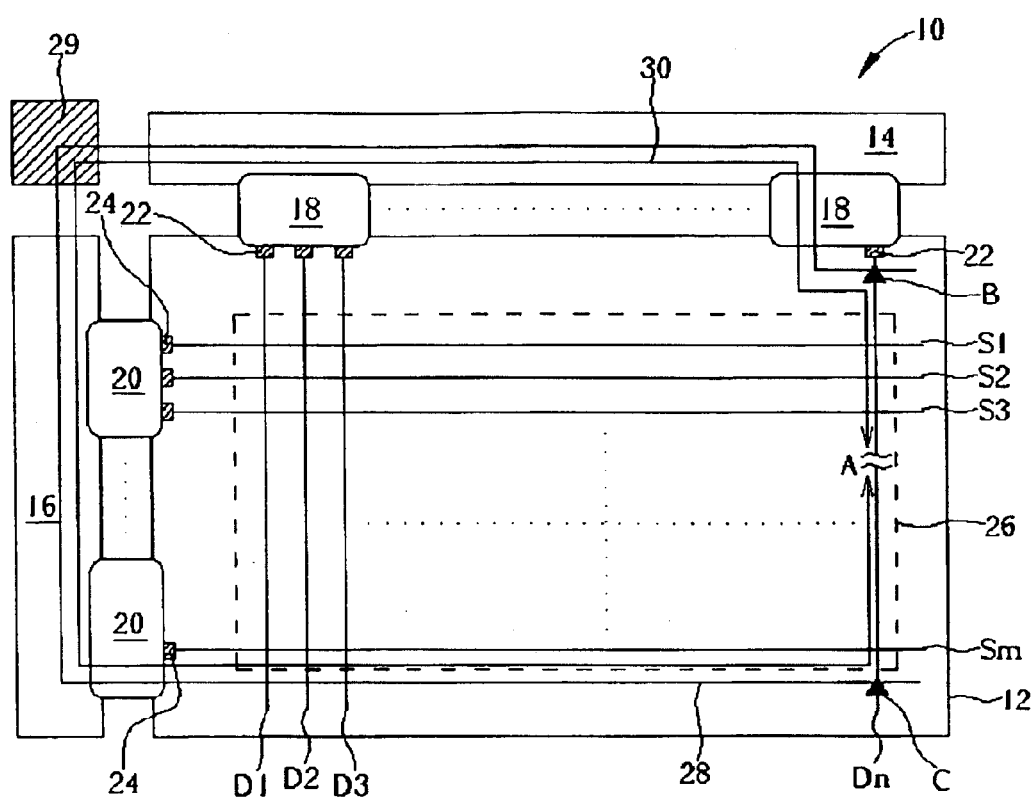
FIG. 2 is a schematic diagram of a method using a repair line to repair an LCD panel according to prior art.
Figure 3:
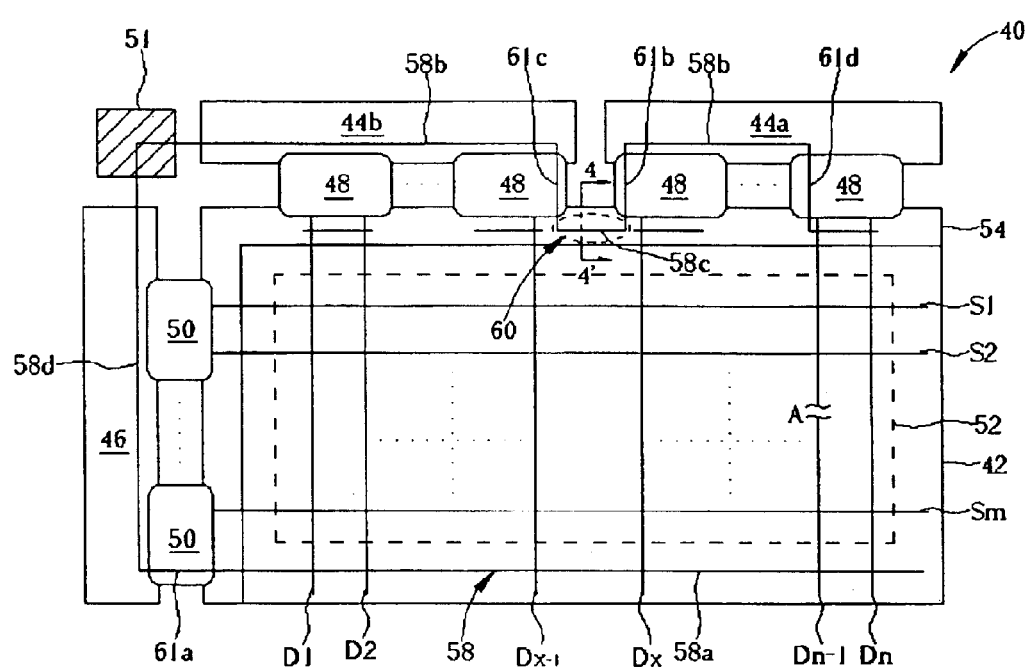
FIG. 3 is a schematic structure of an LCD panel according to a first embodiment of the present invention.

Please refer to FIG. 3, which is a schematic structure of an LCD panel 40 according to a first embodiment of the present invention. As shown in FIG. 3, the LCD panel 40 contains a substrate 42, two X-axial printed circuit boards (X-boards) 44a and 44b, a Y-axial printed circuit board (Y-board) 46, and a flexible printed circuit (FPC) 51 for electrically connecting the X-board 44b and the Y-board 46, wherein the use of the X-boards 44a, 44b, and the Y-board 46 is to output signals to the substrate 42 for enabling the LCD panel 40 to produce images. In addition, the LCD panel 40 further contains a plurality of Tape Carrier Packages (TCPs) 48 and 50, wherein each TCP 18 or 20 contains an ICchip (not shown in FIG. 3). The TCPs 48 are used for electrically connecting the X-boards 44a, 44b, and the substrate 42, and the TCPs 50 are used for electrically connecting the Y-board 46 and the substrate 42.

On the substrate 42 are set a plurality of scan lines $S_1$-$S_m$ and a plurality of data lines $D_1$-$D_n$ perpendicular with the scan lines $S_1$-$S_m$ for defining a plurality of pixels formed in matrix on an active region 52 of the substrate 42. The substrate 42 further contains an outer lead bonding region 54 and a plurality of bonding pads (not shown in FIG. 3) set on the outer lead bonding region 54. Every scan line $S_1$-$S_m$ is electrically connected to its corresponding TCP 50 through a corresponding bonding pad, similarly, every data line $D_1$-$D_n$ is electrically connected to its corresponding TCP 48 through a bonding pad.

In addition, the LCD panel 40 further contains a plurality of repair lines 58. For easily explaining the repair line 58, FIG. 3 only illustrates one repair line 58. The repair line 58, as shown in FIG. 3, comprises a first portion 58a positioned on the substrate 42, two second portions 58b positioned on the X-board 44a and 44b respectively, and a third portion 58c positioned on a connective region 60, and a fourth portion 58d positioned on the Y-board 46, wherein the first portion 58a is connected to the fourth portion 58d by way of a conductive wire 61a on the TCP 50, the second portion 58b is connected to the substrate 42 by way of a connective wire 61d on the TCP 48, and the third portion 58c is connected to each second portion 58b by way of the connective wires 61b and 61c on the TCPs 48. According to this embodiment, the connective region 60 is located on an outer lead bonding region 54 that is positioned between two adjacent data lines $D_x$ and $D_{x-1}$, therefore the third portion 58c in the connective region will not transversely cross the data lines $D_1$-$D_n$ and thereby avoid an RC delay.

Figure 4A:
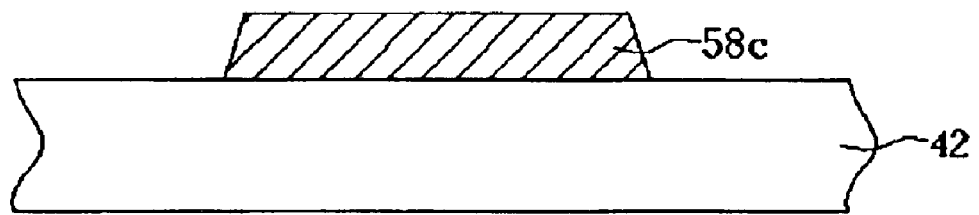
FIGS. 4A and 4B are cross-sectional views along line 4-4" of the LCD panel shown in FIG. 3.
Figure 4B:
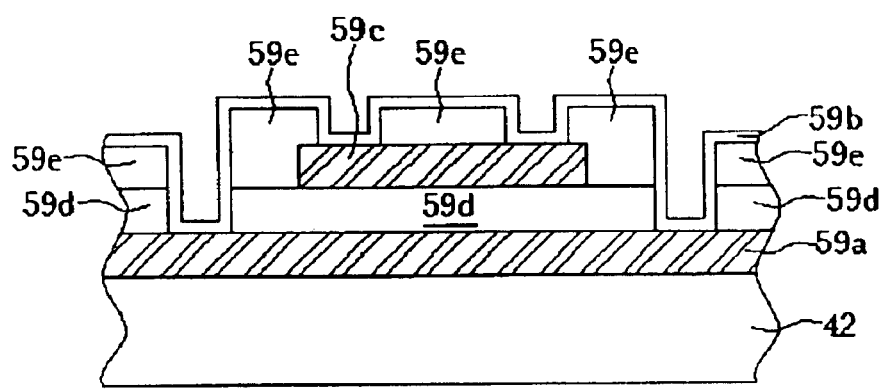

Please refer to FIGS. 4A and 4B. FIGS. 4A and 4B are cross-sectional views along line 4–4" of the LCD panel 40 shown in FIG. 3. The third portion 58c of the repair line 58 is a metal layer, which is capable of being formed with the scan lines $S_1$-$S_m$ or the data lines $D_1$-$D_n$ simultaneously. In addition, the third portion 58c of the repair line 58 can be formed with more than two metal layers electrically connected in parallel to reduce the resistance. For example, as shown in FIG. 4B, the third portion 58c of the repair line 58 is formed with a metal layer 59a and a metal layer 59c, which is electrically connected in parallel with the metal layer 59a. An insulating layer 59d is formed between the metal layer 59a and the metal later 59c, and the metal layer 59a is electrically connected to the metal layer 59c by a transparent electrode 59b, wherein the transparent electrode 59b is formed by a transparent indium tin oxide (ITO). And between the transparent electrode 59b and the metal layer 59a is set a passivation layer 59e. Furthermore, the metal layer 59a and the scan line $S_1$-$S_m$ are formed simultaneously, and the metal layer 59c and the data lines $D_1$-$D_n$ are formed simultaneously.

Figure 5A:
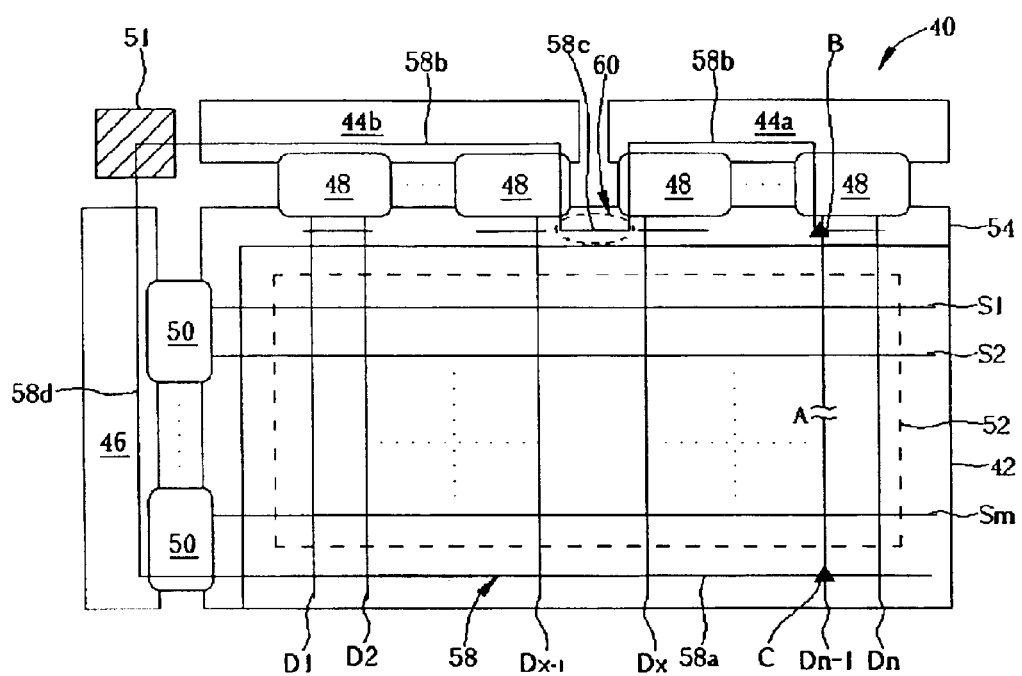
FIGS. 5A and 5B are schematic diagrams of a method using a repair lines to repair an LCD panel according to the present invention.
Figure 5B:
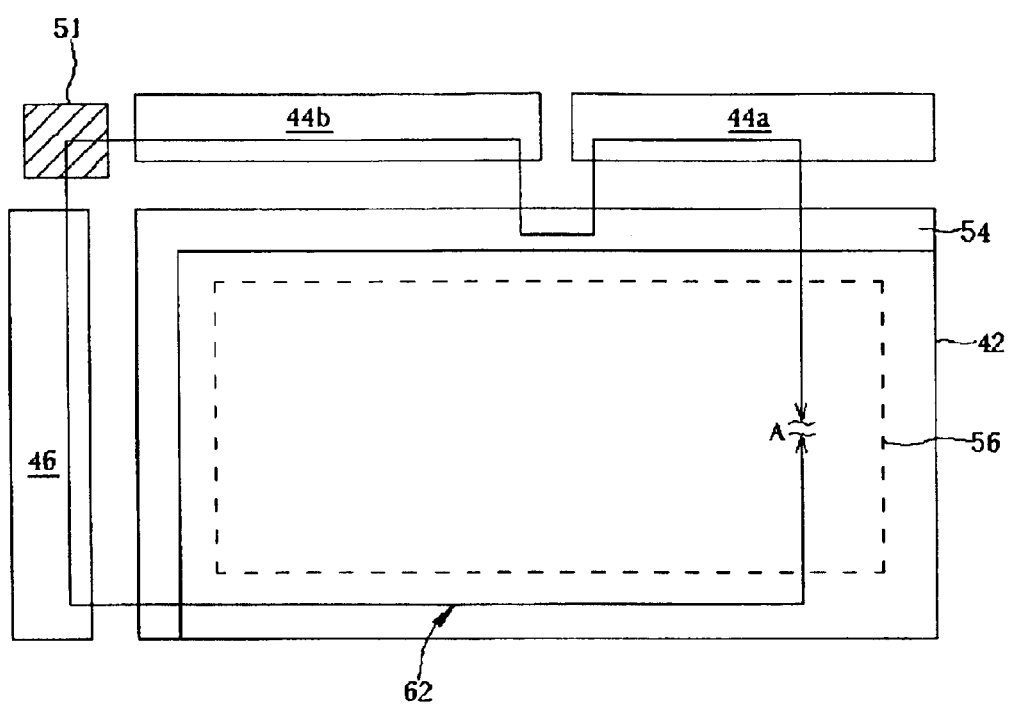

Please refer to FIGS. 5A and 5B, which are schematic diagrams of a method using a repair lines to repair an LCD panel 40 according to the present invention. If there is a disconnection at point A of data line $D_{n-1}$, the terminals point B and C of the data line $D_{n-1}$ will be connected to the repair line 58 by using laser welding. Therefore when a signal is outputted from the X-board 44a or 44b to the data line $D_{n-1}$, the signal will be transmitted to every pixel by passing through a path 62, shown in FIG. 5B, to enable every pixel corresponding to the data line $D_{n-1}$ to work correctly.

In this embodiment, the repair line 58 is divided into a first portion 58a, two second portions 58b, and a third portion 58c to connect the X-board 44a and 44b. The second portions 58b on the X-board 44a and 44b are connected without any connectors, therefore the total amount of the connectors used in the LCD panel 40 can be reduced. In addition, due to the third portion 58c of the repair line 58 being set on the substrate 42 directly, this shortens the length of the repair line 58, reduces the resistance of the repair line 58, avoids the repair line 58 transversely crossing the conductive wires on the X-board 44a and 44b, and furthermore reduces the RC delay of the repair line 58.

Figure 6:
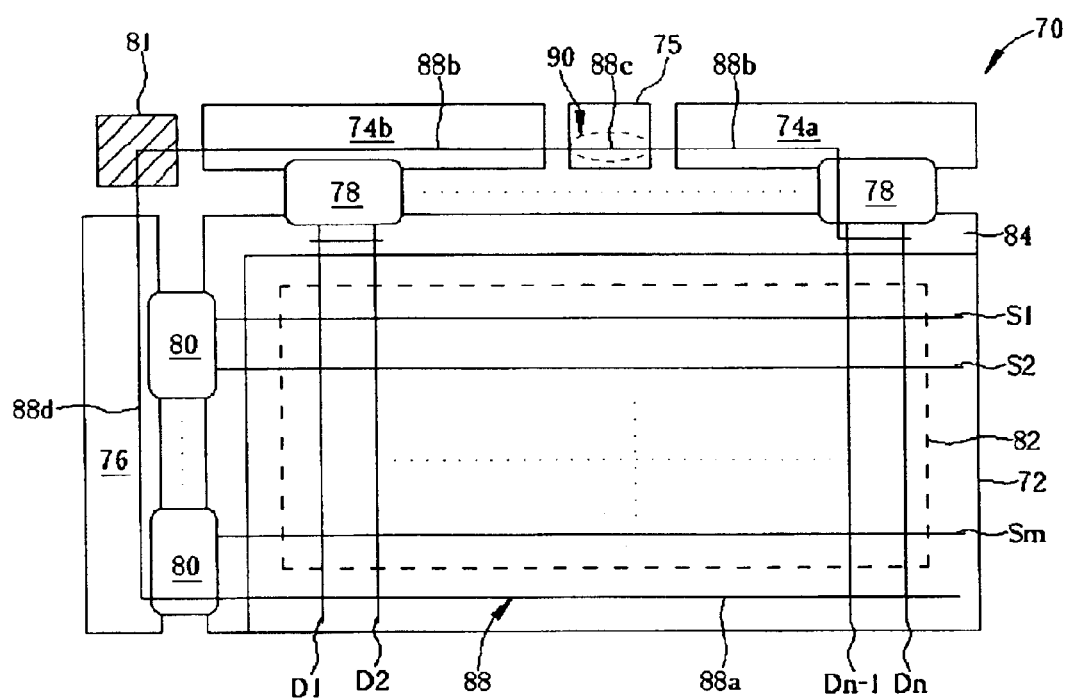
FIG. 6 is a schematic structure of an LCD panel according to a second embodiment of the present invention.

Please refer to FIG. 6. FIG. 6 is a schematic structure of an LCD panel 70 according to a second embodiment of the present invention. The LCD panel 70 contains a substrate 72, two X-boards 74a and 74b, a Y-board 76, and a FPC 81 for connecting the X-board 74b and the Y-board 76, wherein the X-board 74a can be connected to the X-board 74b by a FPC 75, and the FPC 75 can be replaced by a flexible flat cable (FFC). The LCD panel 70 further contains a plurality of TCPs 78 for electrically connecting the X-boards 74a, 74b and the substrate 72, and a plurality of TCPs 80 for electrically connecting the Y-board 76 and the substrate 72.

The substrate 72 has a plurality of scan lines $S_1$-$S_m$ thereon and a plurality of data lines $D_1$-$D_n$ thereon, wherein the scan lines $S_1$-$S_m$ are perpendicular with the data lines $D_1$-$D_n$ for defining pixels (not shown in FIG. 6) formed in a matrix in an active region 82 of the substrate 72. The substrate 72 further contains an outer lead bonding region 84 and a plurality of bonding pads (not shown) set in the outer lead bonding region 84. Each of the scan lines $S_1$-$S_m$ is electrically connected to its corresponding TCPs 80 through a corresponding bonding pad, and similarly each of the data lines $D_1$-$D_n$ is electrically connected to its corresponding TCPs 78 through a bonding pad.

The LCD panel 70 further contains at least a repair line 88. The repair line 88 is divided into a first portion 88a positioned on the substrate 72, two second portions 88b positioned on the X-board 74a and 74b, a third portion 88c for connecting every second portions 88b, and a fourth portion 88d positioned on the Y-board 76. The third portion 88c is set on a connective region 90, which is positioned on the FPC 75 between the X-boards 74a and 74b. It is an advantage that the conductive wire on the FPC 75 can serve as the third portion 88c of the repair line 88 so that the manufacturing process is capable of being simplified.

Figure 7:
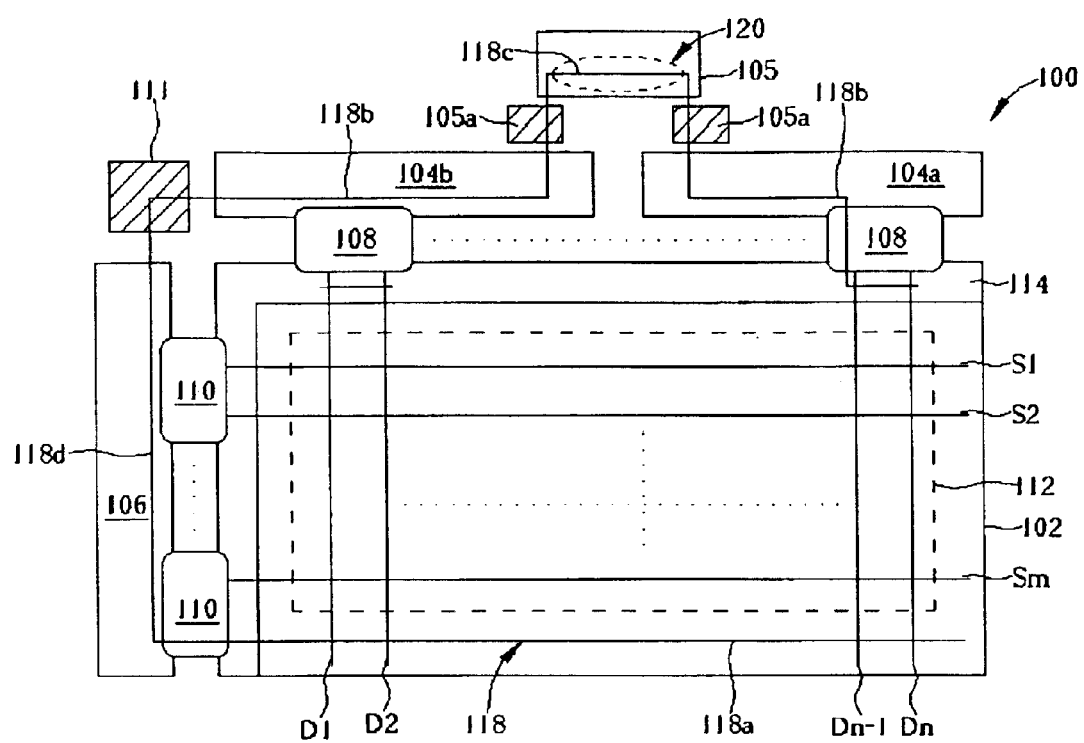
FIG. 7 is a schematic structure of an LCD panel according to a third embodiment of the present invention.

Please refer to FIG. 7, which is a schematic structure of an LCD panel 100 according to a third embodiment of the present invention. The LCD panel 100 contains a substrate 102, two X-boards 104a and 104b, a Y-board 106, and a control board 105 for outputting a signal to the X-boards 104a and 104b to control the operation of the LCD panel 100. The control board 105 is connected to the X-boards 104a and 104b by a plurality of FPCs 105a. The LCD panel 100 further contains a plurality of TCPs 108 and 110, wherein the TCPs 108 is utilized for electrically connecting the X-boards 104a, 104b, and the substrate 102, and the TCPs 110 are utilized for electrically connecting the Y-board 106 and the substrate 102.

The substrate 102 has a plurality of scan lines $S_1$-$S_m$ thereon and a plurality of data lines $D_1$-$D_n$ thereon, wherein the scan lines $S_1$-$S_m$ are perpendicular with the data lines $D_1$-$D_n$ for defining pixels (not shown in FIG. 7) formed in matrix in an active region 102 of the substrate 102. The substrate 72 further contains an outer lead bonding region 114 and a plurality of bonding pads (not shown) set in the outer lead bonding region 114. Each of the scan lines $S_1$-$S_m$ is electrically connected to its corresponding TCPs 110 through a corresponding bonding pad, and similarly each of the data lines $D_1$-$D_n$ is electrically connected to its corresponding TCPs 108 through a bonding pads.

The LCD panel 100 further contains at least a repair line 118. The repair line 118 is divided into a first portion 118a positioned on the substrate 102, two second portions 118b positioned on the X-boards 104a and 104b, a third portion 118c for connecting every second portions 118b, and a fourth portion 118d positioned on the Y-board 106. The third portion 118c is set on a connective region 120 positioned on the control board 105, and the conductive wire on the control board 105 can serve as the third portion 118c directly so as to simplify the manufacturing process.

For avoiding the distortion of the image signal because of the long transmitting path, one can add output amplifiers on the repair line path of the X-board or the Y-board.

In contrast to the prior art, the present invention LCD panel contains a connective region so that the repair line on each of the X-boards can be connected in the connective region. The connective region can be set on the substrate, on the FPC, which electrically connects each of the X-boards, or on a control board. If the connective region is set on the substrate of the LCD panel, the amount of the connectors for connecting two adjacent X-boards can be reduced. It will also shorten the length of the repair line so that the resistance of the repair line and the situation of the repair line transversely crossing conductive wires of the X-boards will both be reduced, and that will reduce the effect of the RC delay. If the connective region is set on the FPC or on a control board, the conductive wires on the FPC or the control board can be used to connect the repair line so that the manufacturing process can be simplified.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A liquid crystal display panel comprising:
   a first substrate having a plurality of first conductive wires thereon, the first conductive wires being arranged in parallel with each other along a first direction;
   at least two first printed circuit boards electrically connected to the first substrate respectively for outputting signals to the first conductive wires; and
   at least one repair line having a first portion positioned on the first substrate, a second portion positioned on each of the printed circuit boards, and a third portion positioned on a connective region located between the printed circuit boards.

2. The liquid crystal display panel of claim 1 wherein the first substrate further comprises a plurality of second conductive wires thereon that are arranged in parallel with each other along a second direction, and at least a second printed circuit board for outputting signals to the second conductive wires, wherein the second direction is approximately perpendicular to the first direction.

3. The liquid crystal display panel of claim 2 wherein the repair line further comprises a fourth portion positioned on the second printed circuit board.

4. The liquid crystal display panel of claim 2 wherein each of the first conductive wires is a scan line, and each of the second conductive wires is a data line.

5. The liquid crystal display panel of claim 2 wherein each of the first conductive wires is a data line, and each of the second conductive wires is a scan line.

6. The liquid crystal display panel of claim 1 wherein the connective region is located on an outer lead bonding region that is positioned between two adjacent first conductive wires, and the outer lead bonding region comprises at least a bonding pad thereon for connecting the first printed circuit boards to the first substrate through the bonding pad.

7. The liquid crystal display panel of claim 2 wherein a thin film transistor having a gate electrode, a source electrode, and a drain electrode is formed at an intersection of each of the first conductive wires and each of the second conductive wires, and the thin film transistor is used as a switch device of a pixel.

8. The liquid crystal display panel of claim 7 wherein the third portion of the repair line comprises a first metal layer that is formed in a same process as the gate electrode.

9. The liquid crystal display panel of claim 7 wherein the third portion of the repair line comprises a second metal layer that is formed in a same process as the source and the drain electrodes.

10. The liquid crystal display panel of claim 7 wherein the third portion of the repair line comprises a first metal layer and a second metal layer electrically connected in parallel, and the second metal layer is connected with the first metal layer through a third metal layer, wherein the first metal layer and the gate electrode are formed simultaneously, while the second metal layer and the source/drain electrodes are formed simultaneously.

11. The liquid crystal display panel of claim 10 wherein the third metal layer is composed of indium tin oxide (ITO).

12. The liquid crystal display panel of claim 1 wherein the liquid crystal display panel further comprises a second substrate positioned in parallel and opposite to the first substrate.

13. The liquid crystal display panel of claim 12 wherein the connective region is located on the first substrate and within a non-display region of the liquid crystal display panel, and the second substrate comprises a region opposite to the connective region and the region is located within the non-display region of the liquid crystal display panel.

14. The liquid crystal display panel of claim 1 wherein the first printed circuit boards are connected to each other through a flexible printed circuit board (FPC), and the connective region is located on the flexible printed circuit board.

15. The liquid crystal display panel of claim 1 wherein the first printed circuit boards are connected to each other through a flexible flat cable (FFC), and the connective region is located on the flexible flat cable.

16. The liquid crystal display panel of claim 1 wherein the liquid crystal display panel further comprises a control board connected to both of the first printed circuit boards, and the control board is utilized for outputting signals to the first printed circuit boards for controlling the operation of the liquid crystal display panel, and the connective region is located on the control board.

17. The liquid crystal display panel of claim 1 wherein each of the first printed circuit boards is connected to the first substrate through at least a tape carrier package (TCP).

* * * * *

UNITED STATES PATENT AND TRADEMARK OFFICE
CERTIFICATE OF CORRECTION

| | | |
|---|---|---|
| PATENT NO. | : 6,819,370 B2 | Page 1 of 1 |
| APPLICATION NO. | : 10/249671 | |
| DATED | : November 16, 2004 | |
| INVENTOR(S) | : Sah et al. | |

It is certified that error appears in the above-identified patent and that said Letters Patent is hereby corrected as shown below:

On the title page: Item [54] should read -- LIQUID CRYSTAL DISPLAY PANEL.

Signed and Sealed this

Eighth Day of August, 2006

JON W. DUDAS
*Director of the United States Patent and Trademark Office*